United States Patent [19]
Nishigaki et al.

[11] 3,959,235
[45] May 25, 1976

[54] METHOD OF POLYMERIZING VINYL CHLORIDE

[75] Inventors: Masahiko Nishigaki, Nishinomiya; Masami Ohnishi; Yosuke Ichikawa, both of Kobe; Kazuhiko Katayama, Akashi, all of Japan

[73] Assignee: Kanegafuchi Kagaku Kogyo Kabushiki Kaisha, Osaka, Japan

[22] Filed: July 17, 1975

[21] Appl. No.: 596,855

[30] Foreign Application Priority Data
July 24, 1974    Japan.................................. 49-85849

[52] U.S. Cl.............................. 526/62; 526/332; 526/296; 526/342; 526/255; 526/345; 526/74; 526/219; 526/227; 526/232; 526/213; 526/209; 526/210; 526/199; 526/200; 526/201; 526/271; 526/280; 526/319; 526/317

[51] Int. Cl.$^2$......................... C08F 2/18; C08F 2/22

[58] Field of Search........ 260/92.8 W, 87.1, 87.5 G, 260/86.3, 78.5 CL, 78.5 B, 78.5 UA, 87.5 C, 87.7, 87.5 A, 87.5 R, 85.5 XA

[56] References Cited
UNITED STATES PATENTS

| | | |
|---|---|---|
| 3,515,709 | 6/1970 | Nelson et al. ................. 260/92.8 W |
| 3,562,238 | 2/1971 | Parks ................................ 260/85.5 |
| 3,661,867 | 5/1972 | Koyanagi et al. .............. 260/92.8 W |
| 3,669,946 | 6/1972 | Koyanagi et al. .................. 260/86.3 |
| 3,778,423 | 12/1973 | Reiter ............................... 260/87.1 |
| 3,817,959 | 6/1974 | Balwé et al. ....................... 260/87.1 |
| 3,842,055 | 10/1974 | Gabriel et al. ................. 260/92.8 W |

*Primary Examiner*—Alan Holler
*Attorney, Agent, or Firm*—Armstrong, Nikaido & Wegner

[57] ABSTRACT

Vinyl chloride monomer, or a monomeric mixture comprising vinyl chloride as a main component and other monomers co-polymerizable therewith in an aqueous reaction medium, is polymerized in a polymerization vessel. All of the surfaces of the inside walls of the vessel and the agitator blades, the baffle plates and the like with which the vessel is equipped, are coated prior to the polymerization with at least one of a specific class of nitrogen-containing aromatic heterocyclic compounds. Not only is the deposition of polymer scale surprisingly reduced, but also the polymer thus obtained has good physical and chemical properties.

15 Claims, No Drawings

METHOD OF POLYMERIZING VINYL CHLORIDE

DETAILED DESCRIPTION OF THE INVENTION

The present invention relates to a method of reducing polymer scale deposited on the surfaces of a polymerization vessel, such surfaces including the inner walls, the agitator blades, the baffle plates and the like, during the polymerization in an aqueous reaction medium of vinyl chloride monomer alone or a monomeric mixture of vinyl chloride monomer as a main component and other monomers co-polymerizable therewith. The invention also relates to a method of improving the properties of vinyl chloride resin thus obtained, the so-called "Fish Eyes(non-gelatinized part)" in particular.

When vinyl chloride monomer alone or a monomeric mixture of vinyl chloride monomer as a main component and other monomers co-polymerizable therewith in an aqueous reaction medium is suspension-polymerized in the presence of a suspending agent and an oil-soluble catalyst, or emulsion-polymerized in the presence of an emulsifying agent and a water-soluble catalyst, there is a big problem of polymer scale deposition on the inner walls of the polymerization vessel, the agitation blades, the baffle plates and the like. The polymer scales lower the effectiveness of the heat conductance of the polymerization vessel, the yield of the polymer thus obtained, the properties of the polymer product due to the polymer scales coming off the container walls to co-mingle with the product, and also, the rate of operation of the vessel since it takes a great deal of time and labor to remove the scales.

In order to solve these problems, a number of methods for preventing polymer scale from generating or depositing have hitherto been proposed, but no sufficient or practically satisfactory results have been obtained to date, viz. each method has its own advantages and disadvantages. Among such methods as heretofore proposed, it would be expected that a method of coating, prior to the polymerization, the inside walls of the vessel with some kind of chemical compound may be a superior one, provided that such compound or compounds producing a marked preventative effect with respect to polymer scales could be discovered.

As far as the methods of this kind are concerned, it has been proposed in the U.S. Pat. No. 3,669,946 that the inner walls of the vessel are coated with a coating compound selected from the group consisting of nitrogen atom-containing organic compounds comprising azo radical-containing compounds, nitro radical-containing compounds, nitroso radical-containing compounds, azomethine radical-containing compounds, azine cyclic-containing compounds and amines; sulfur atom-containing organic compounds comprising thiocarbonyl radical-containing compounds, thioether radical-containing compounds and thioalcohol radical-containing compounds; oxygen atom-containing compounds comprising quinones, ketones, aldehydes, alcohols having at least six carbon atoms and carboxylic acids having at least six carbon atoms. According to the experiments of the present inventors, however, the coating of such a variety of compounds as concretely described in the specification mentioned above showed only a small effect of reducing the quantity of polymer scales, which was very far from being satisfactory for practical and commercial use. In the same U.S. Patent, dyes or pigments as the coating compounds are also disclosed, but dyes and pigments are inherently colored substances to be used for coloring something else and are not always desirable as a coating compound due to a risk of staining the polymer product involved. It has further been proposed in the Japanese Publication (not examined) No. 44375/73 that the inner walls of the polymerization container are coated with a free radical inhibitor. In the Publication, it is disclosed that α-methyl styrene gave a marked result in particular among various kinds of free radical inhibitors. But in the experiments followed by the present inventors using α-methyl styrene, the scale reduction effect could hardly be ascertained. As was explained above, a coating compound for the polymer scale prevention which is very satisfactory for practical and industrial use has not yet been offered.

It is an object of the present invention to provide a method of polymerizing vinyl chloride, with which the desired polymer scale prevention is remarkably and surprisingly achieved.

Another object of the present invention is to provide a scale-free method of polymerizing vinyl chloride in order to obtain vinyl chloride resin especially superior in the absence of the so-called "Fish Eyes (non-gelatinized part)".

These and other objects of the present invention will become apparent from the description hereinafter.

The present inventors have made an extensive study to attain the objects mentioned earlier and have found that a new polymerization method using as a coating agent a certain nitrogen atom-containing aromatic heterocyclic compound, having a chemical formula quite different from those of coating compounds as heretofore proposed, can produce a far more superior scale reduction effect compared with such publicly-known methods as were described above.

The present invention is directed to a method of polymerizing vinyl chloride monomer either alone or as a monomeric mixture comprising vinyl chloride as a main monomeric component and other monomers co-polymerizable therewith in an aqueous reaction medium. The invention provides an improvement which comprises coating, prior to the polymerization, all the surfaces of the polymerization vessel such as inner walls, agitator blades and the like with at least one nitrogen atom-containing aromatic heterocyclic compound selected from the group consisting of di-indolyls and 3,3'-indoleninylidene. According to the present invention, almost perfect scale prevention, with the inside walls of the container maintaining its own metal gloss after the polymerization, can be achieved. Also there is a noted improvement of the vinyl chloride polymer with respect to a reduction in the so-called "Fish Eyes". The present invention is further characterized by the elimination of the danger of coloring the polymer even if the coating compounds used are co-mingled with the polymer. Furthermore, the acute toxicity of the compounds is small; thus there is no danger to the user.

Di-indolyls used in the present invention include 3,3'-di-indolyl

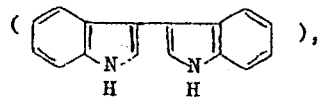

2,2'-di-indolyl

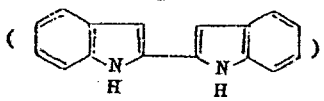

and 2,3'-di-indolyl

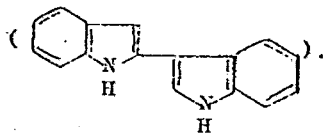

3,3'-diindoleninylidene has the following chemical formula:

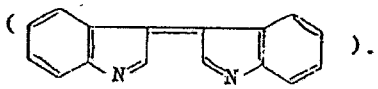

3,3'-di-indolyl is synthesized by, for example, the method taught at page 562, Vol. 69, "Gazzetta Chimica Italiana", 1939. 2,2'-di-indolyl and 3,3'-diindoleninyliene are obtained by the method shown at page 4141, "Journal of the Chemical Society", 1957. A synthetic method of 2,3'-di-indolyl is exemplified at page 1, Vol. 504, "Annalen der Chemie" 1933.

These coating compounds are dissolved in an appropriate solvent or diluted with a suitable diluent, and then applied with a brush or by a spray method onto the surface of the inside walls of the vessel, the agitator blades, the baffle plates and any other surfaces on which polymer scales are apt to deposit. Any solvent or diluent which is capable of dissolving or diluting these compounds may be employed, examples of which are tetrahydrofuran, ethanol, 1,1,1-trichloroethane, chloroform, dichloroethane, methanol, diethyl ether, toluene and the like. The amount of the compound used in the present invention is within the extent required to form a thin film onto the surface being coated, usually, in an amount in the range of from 0.001 g/m$^2$ to 1 g/m$^2$. In cases where less than 0.001 g/m$^2$ are applied, polymer scales may deposit on surfaces where the thin film fails to completely cover and the number of "Fish Eyes" in the vinyl chloride polymer increases. As a rule, the greater the amount of compound applied, the more effective the scale prevention. The use of a greater amount of the compound makes it possible for the scale prevention effect to last longer, and results in an increase in the number of possible polymerizations without deposition of scales. The upper limit on the amount of the compound applied is practical rather than theoretical. The amount used can be greater than 1 g/m$^2$, unless an adverse effect occurs. It is not necessarily recommendable to use the compounds of the invention in an extremely large amount since they are likely to co-mingle with the polymer product and do not result in scale prevention proportional to the amount of the compound used.

The present invention is applied to the polymerization of vinyl chloride monomer alone or to a monomeric mixture comprising vinyl chloride as a main monomer and other monomers co-polymerizable therewith. In general the monomer to be polymerized comprises 60 to 100% vinyl chloride and 0 to 40% copolymerizable monomer.

Other monomers co-polymerizable with vinyl chloride monomer used in the present invention include vinyl esters such as vinyl acetate and vinyl propionate; vinyl ethers such as methyl vinyl ether; esters of acrylic acid or methacrylic acid such as methyl acrylate butyl acrylate and methyl methacrylate; maleic acid or fumaric acid and anhydrides or esters thereof; olefines such as ethylene and propylene; halogenated olefines such as vinylidene chloride, vinyl bromide and vinyl fluoride; nitrilic compounds such as acrylonitrile and the like.

Suspension polymerization and emulsion polymerization are widely known as methods for polymerizing vinyl chloride monomer alone or a monomeric mixture as described above in an aqueous reaction medium. Suspension polymerization is carried out in the presence of a suspending agent and an oil-soluble catalyst and emulsion polymerization is conducted in the presence of an emulsifying agent and a water-soluble catalyst.

Suspending agents for the suspension polymerization used in the present invention include partially saponified polyvinyl acetate, polyacrylic acid, copolymers of styrene or vinyl acetate and maleic anhydride, methyl cellulose, gelatin or any other known suspending agent. Oil-soluble catalysts may be exemplified by organic peroxides such as benzoyl peroxide, lauroyl peroxide and isopropylperoxydicarbonate, and useful azo-compounds include azobisisobutylonitrile and azobisdimethylvaleronitrile.

Emulsifying agents for the emulsion polymerization may be exemplified by anionic emulsifying agents such as sodium alkylbenzene sulfonate, sodium lauryl sulfonate, sodium dioctylsulfo succinate and sodium lauryl sulfate; and non-ionic emulsifying agents such as polyoxyethylene alkyl ether, polyoxyethylene alkyl allyl ether and polyoxyethylene sorbitan fatty acid partial ester. Water-soluble catalysts used in the present invention include ammonium persulfate, potassium persulfate and any other known water-soluble catalyst.

When vinyl chloride monomer or a monomeric mixture of vinyl chloride monomer as a main component and other monomers co-polymerizable with vinyl chloride monomer is polymerized under ordinary conditions in an aqueous reaction medium, a considerable amount of polymer scale, even after one polymerization batch, deposits on the inside walls of the polymerization vessel, the agitator blades, the baffle plates and the like. If a stainless steel polymerization container is employed, all the surfaces of the inner walls of the container are covered with polymer scales to the extent that the gloss of stainless steel is lost. The thickness of the scale deposit increases with the number of successive batch operations. On the particular places where the scales are likely to deposit, a fairly thick layer of polymer scales is often formed. The polymer scales not only adversely affect the heat conductance efficiency of the container walls, the polymer yield and the quality of the polymer, but they also lower the operating time of the polymerization container because a good deal of labor and time is required for removal of the scales.

In accordance with the method of the present invention, even after several successive batch operations if a sufficient amount of compound is applied, no adherence of the polymer scales can be noticed and the container walls of a stainless steel vessel remain glossy. The present invention, as is apparent from the above, surprisingly eliminates many disadvantages as described aforesaid.

The invention is illustrated in more detail by way of the examples that follow. In the examples physical properties were observed according to the following manner;

1. Fish Eyes (F.E.)

The compound having a compounding ratio as given in Table A was kneaded on rolls heated at 150°C for 7 minutes to prepare five sheets of 0.2 mm in thickness. Next, a beam of light was irradiated on these sheets and the average number of fish eyes (non-gelatinized portions) per 100 cm² of each sheet which could be seen with the naked eye was counted.

TABLE A

| Components | Parts by weight |
|---|---|
| Polymer | 100 |
| Tri-basic lead sulfate | 3 |
| Stearic acid | 0.5 |
| Titanium white | 0.25 |
| Carbon black | 0.02 |
| Dioctyl phthalate | 40 |

2. Heat stability

The compound comprising components as given in Table B was kneaded on rolls heated at 160°C for 5 minutes to obtain thin sheets. Said several sheets of compound were heaped up, then pressed under a pressure 150 Kg/cm² at 170°C for 15 minutes to make a sample sheet of 5 mm in thickness, color tone of which was observed with the naked eye.

TABLE B

| Components | Parts by weight |
|---|---|
| Polymer | 100 |
| N-2000C* | 3.0 |
| VLTN-4** | 0.5 |
| Dioctyl phthalate | 2.0 |

*Dibutyl tin maleate stabilizer, manufactured by Nitto Kasei Chem. Co., Ltd.
**Ethyleneglycol monoester lubricant manufactured by Kawaken Fine Chemical Co., Ltd.

EXAMPLES

Example 1

The surface of the inner walls of a stainless steel polymerization vessel having a capacity of 1,000 liters was coated prior to polymerization with the compounds as listed in Table 1. Each compound was dissolved in tetra-hydrofuran and then applied. After the coated surface was dried, 200 Kg. of vinyl chloride monomer, 450 Kg of pure water, 180 g. of partially saponified polyvinyl acetate and 50 g. of azobisdimethylvaleronitrile were charged into the polymerization vessel and then polymerization of vinyl chloride monomer was carried out at 56°C for 13–15 hours. After the polymerization was completed, the obtained vinyl chloride polymer was taken out, and then the amount of polymer scales deposited on the inside surface of the vessel was weighed. The results are given in Table 1, wherein the amount of the coated compounds and the amount of polymer scales are shown in the form of weight (g) per unit area (m²) of the inner surface of the vessel.

Comparative examples in Table 1 are presented for better understanding of the effect of the present invention, wherein coating compounds said to have a considerable effectiveness in polymer scale prevention were selected from those described as being effective in U.S. Pat. No. 3,669,946.

TABLE 1

| | Coated compounds | Coated amount (g/m²) | Scales Amount (g/m²) |
|---|---|---|---|
| Examples | 3,3'-di-indolyl | 0.007 | 0 |
| | 3,3'-di-indolyl | 0.490 | 0 |
| | 2,2'-di-indolyl | 0.028 | 0 |
| | 2,3'-di-indolyl | 0.022 | 0 |
| | 3,3'-di-indoleninylidene | 0.008 | 0 |
| | 3,3'-di-indoleninylidene | 0.650 | 0 |
| Comparative examples | Pyridine | 0.031 | 205 |
| | Pyrazine | 0.031 | 221 |
| | Morpholine | 0.031 | 232 |
| | Ethanolamine | 0.031 | 102 |
| | Di-ethanolamine | 0.031 | 34 |
| | Aniline | 0.031 | 217 |
| | — | — | 225 |

As is self-explanatory from the results in Table 1, in cases where the inner walls of the vessel were coated with nothing or a different kind of compound employed in the comparative examples, the inner surfaces of the vessel were covered with a white polymer scale layer. On the other hand, when the compounds of the present invention were applied, the scales did not deposit in the least, so that the metal gloss of the inner surface of the vessel could be completely maintained. These experiments demonstrate the superior effect of the present invention in comparison with the known methods.

Example 2

The polymerization was carried out under the same conditions except that the coated amount of the compounds was set at 0.160 g/m², and the properties of the resultant polymer were evaulated. Table 2 shows the results.

TABLE 2

| | Examples | | Comparative Example | |
|---|---|---|---|---|
| Coated compounds | 3,3'-di-indolyl | 3,3'-di-indoleninylidene | Oil Black | — |
| F.E. (Number/100cm²) | 4 | 4 | 59 | 43 |

TABLE 2-continued

|  | Examples | | Comparative Example | |
|---|---|---|---|---|
| Heat Stability | good | good | not good | good |

As it is clearly shown in Table 2, in cases where 3,3'-di-indolyl or 3,3'-di-indoleninylidene of the present invention was employed as a coated compound, the obtained polymer proved to have an extremely small number of fish eyes without adversely affecting heat stability.

Example 3

Vinyl chloride was repeatedly polymerized in order to evaluate the durability of the scale prevention. The polymerization was repeated batchwise until the deposition of polymer scales could be noticed with the naked eye, and the number of batchwise operations repeated without the scale deposition being noticed was counted. The results are given in Table 3.

TABLE 3

| Coated compounds | Coated amount (g/m²) | Number of batch Operations repeated |
|---|---|---|
| 3,3'-di-indolyl | 0.080 | 6 |
| 3,3'-di-indolyl | 0.007 | 2 |
| 3,3'-di-indoleninylidene | 0.069 | 8 |
| 3,3'-di-indoleninylidene | 0.008 | 5 |

Example 4

The inner walls of a stainless steel polymerization vessel having a capacity of 1,000 liters were coated prior to polymerization with a 10% tetrahydofuran solution containing 3,3'-di-indolyl, then tetrahydrofuran was removed by drying. 3,3'-di-indolyl was thus fixed in an appropriate amount of 0.40 g/m² onto the inner walls of the container. Into this container 450 Kg of pure water, 900 g. of sodium lauryl sulfonate and 240 g. of ammonium persulfate were charged and 150 Kg of vinyl chloride monomer were charged after air in the container was replaced with nitrogen gas. The polymerization was conducted a 55°C for 11 hours, then the polymer thus obtained was taken out. No deposition of the polymer scales on the inside wall could be observed. On the other hand, in the case where the polymerization was performed without coating, scales amounting to 350 g/m² were deposited.

Reference Example

An acute toxicity test of 3,3'-di-indolyl and 3,3'-diindoleninylidene used in the present invention was made by means of oral administration to mice. First, a quantity of each of 3,3'-di-indolyl and 3,3'-di-indoleninylidene was suspended in a 0.5% solution of carboxymethyl cellulose (CMC) to a desired concentration, then 0.5 ml of said suspension per 10 g bodyweight at a time was compulsorily administered to the mice. The number of dead mice, change in appearance and a change in body weight was observed, which results appear in Table 4.

TABLE 4

| Compound | Administered amount (g/Kg) | Change of average body-weight with the lapse of day (g) Number of days after administration | | | | | | Death rate (Number dead/Number administered |
|---|---|---|---|---|---|---|---|---|
| | | 0 | 1 | 3 | 5 | 7 | 10 | |
| 3,3'-di-indolyl | 5.0 | 27.0 | 27.9 | 29.8 | 30.5 | 31.9 | 33.2 | 0/10 |
| | 2.5 | 26.8 | 27.4 | 28.9 | 30.3 | 31.0 | 32.8 | 0/10 |
| | 1.5 | 27.5 | 28.5 | 29.9 | 30.5 | 32.1 | 33.4 | 0/10 |
| | 1.0 | 27.0 | 27.5 | 29.7 | 30.4 | 31.2 | 32.7 | 0/10 |
| | 0.5 | 26.6 | 27.6 | 29.3 | 30.1 | 31.1 | 32.0 | 0/10 |
| 3,3'-di-indolen-inylidene | 5.0 | 26.6 | 26.9 | 28.6 | 29.6 | 30.1 | 31.8 | 0/10 |
| | 2.5 | 27.5 | 28.1 | 30.4 | 30.9 | 32.1 | 33.7 | 0/10 |
| | 1.5 | 26.5 | 27.2 | 28.6 | 29.4 | 30.4 | 31.8 | 0/10 |
| | 1.0 | 26.7 | 27.5 | 29.2 | 30.4 | 31.1 | 32.6 | 0/10 |
| | 0.5 | 27.3 | 27.5 | 28.9 | 30.3 | 31.1 | 32.7 | 0/10 |

As it is obvious from Table 4, neither dead mice, change of appearance nor decrease in body-weight were observed.

Example 5

The inside surface of a stainless steel polymerization vessel having a capacity of 1,000 liters was coated prior to polymerization with a 1 % of ethanol solution containing 3,3'-di-indolyl, then ethanol was removed by drying. Approximately 0.32 g/m² of 3,3'-di-indolyl were thus fixed onto the inside surface of the vessel. Into the polymerization vessel thus treated, 180 kg of vinyl chloride, 20 kg of vinyl acetate, 500 kg of pure water, 1 kg of partially saponified polyvinyl acetate, 200 g of azobisisobutylonitrile were charged and the polymerization was carried out at 58° C for 10 hours. After the polymerization having been finished, the obtained polymer was taken out. No adherence of the polymer scales onto the inside walls, the agitator blades, the baffle plates and the like could be noticed.

In the case, on the other hand, where the polymerization was performed under the same conditions except that no 3,3'-di-indolyl was applied, the quantity of the polymer scales amounted to as much as 190 g/m².

Example 6

The inner surface of a stainless steel polymerization vessel having a capacity of 1,000 liters was coated, prior to polymerization, with a 0.5 % tetrahydrofuran solution containing 3,3'-di-indoleninylidene, then solvent was removed by drying, thereby about 0.10 g/m² of 3,3'-di-indoleninylidene were attached to the inner surface of the vessel. Next, 145 kg of vinyl chloride, 55 kg of butyl acrylate, 500 kg of pure water, 300 g of polyvinyl alcohol, 600 g of gelatin and 360 g of azobisisobutylonitrile were charged into said vessel and polymerized at 50° C for 16 hours. After the polymerization was ended, the resultant polymer was taken out. No adherence of the polymer scales onto the surface of the vessel, the agitator blades or the like was observed.

In contrast, the polymerization without 3,3'-di-indoleninylidene being applied produced approximately 240 g/m² of the polymer scales.

What we claim is:

1. In a method of polymerizing a monomer comprising vinyl chloride in an aqueous reaction medium, the improvement which comprises coating prior to polymerization the surfaces of the polymerization vessel and auxilliary equipment with at least one compound selected from the group consisting of 3,3'-di-indolyl, 2,2'-di-indolyl, 2,3'-di-indolyl and 3,3'-di-indoleninylidene.

2. The method of claim 1, wherein the amount of compound applied to the vessel surfaces is in the range of from 0.001 g/m² to 1 g/m².

3. The method of claim 1 wherein the monomer comprising vinyl chloride is vinyl chloride.

4. The method of claim 1 wherein the monomer comprising vinyl chloride is a monomeric mixture comprising vinyl chloride as a main component and at least one other copolymerizable monomer as a minor component.

5. The method of claim 4, wherein the other copolymerizable monomer is at least one member selected from the group consisting of vinyl acetate, vinyl propionate, methyl vinyl ether, methyl acrylate, butyl acrylate, methyl methacrylate, maleic acid, fumaric acid, anhydrides or esters of maleic acid or fumaric acid, ethylene, propylene, vinylidene chloride, vinyl bromide, vinyl fluoride and acrylonitrile.

6. The method of claim 1, wherein the monomer is suspension polymerized in the presence of a suspending agent and an oil-soluble catalyst and the suspending agent is partially saponified polyvinyl acetate, polyacrylic acid, a copolymer of styrene or vinyl acetate and maleic anhydride, methyl cellulose or gelatin.

7. The method of claim 6, wherein the oil-soluble catalyst in an organic peroxide or an azo compound.

8. The method of claim 7, wherein the organic peroxide is benzoyl peroxide, lauroyl peroxide or isopropyl peroxydicarbonate.

9. The method of claim 7, wherein the azo-compound is azobisisobutylonitrile or azobisdimethylvaleronitrile.

10. The method of claim 1, wherein the monomer is emulsion polymerized in the presence of an emulsifying agent and a water soluble catalyst and the emulsifying agent is anionic emulsifying agent or non-ionic emulsifying agent.

11. The method of claim 10, wherein the anionic emulsifying agent is sodium alkylbenzene sulfonate, sodium lauryl sulfonate, sodium dioctylsulfosuccinate or sodium lauryl sulfate.

12. The method of claim 10, wherein the non-ionic emulsifying agent is polyoxyethylene alkyl ether, polyoxyethylene alkyl allyl ether or polyoxyethylene sorbitan fatty acid partial ester.

13. The method of claim 10, wherein the water-soluble catalyst is ammonium persulfate or potassium persulfate.

14. The method of claim 1, wherein the compound is dissolved in a solvent or diluted with a diluent and then applied to the surfaces of the polymerization vessel and auxiliary equipment.

15. The method of claim 14, wherein said solvent or diluent is one member selected from the group consisting of tetrahydrofuran, ethanol, 1,1,1-trichloroethane, chloroform, dichloroethane, methanol, diethyl ether and toluene.

* * * * *